(12) United States Patent
Patterson

(10) Patent No.: US 7,438,316 B2
(45) Date of Patent: Oct. 21, 2008

(54) INFLATOR COMBUSTION CONTROL MECHANISM

(75) Inventor: Donald B. Patterson, Rochester, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 96 days.

(21) Appl. No.: 11/365,374

(22) Filed: Feb. 28, 2006

(65) Prior Publication Data

US 2006/0197325 A1     Sep. 7, 2006

Related U.S. Application Data

(60) Provisional application No. 60/657,498, filed on Mar. 1, 2005.

(51) Int. Cl.
*B60R 21/26* (2006.01)
(52) U.S. Cl. ........................ 280/741; 280/742
(58) Field of Classification Search ................ 280/737, 280/740, 742, 736, 741, 739
See application file for complete search history.

(56) References Cited

U.S. PATENT DOCUMENTS

| | | | | |
|---|---|---|---|---|
| 4,021,058 A | * | 5/1977 | Suzuki et al. ............... | 280/737 |
| 4,172,465 A | | 10/1979 | Dashner ................ | 137/533.27 |
| 4,394,033 A | * | 7/1983 | Goetz et al. .................. | 280/736 |
| 5,195,777 A | * | 3/1993 | Cuevas ........................ | 280/736 |
| 5,257,817 A | * | 11/1993 | Cuevas ........................ | 280/736 |
| 5,609,359 A | * | 3/1997 | Johnson et al. ............. | 280/736 |
| 5,618,057 A | | 4/1997 | Johnson et al. | |
| 6,039,347 A | | 3/2000 | Maynard | |
| 6,062,598 A | | 5/2000 | Faigle ......................... | 280/736 |
| 6,176,518 B1 | | 1/2001 | Faigle ......................... | 280/736 |
| 6,199,905 B1 | | 3/2001 | Lewis | |
| 6,789,820 B2 | | 9/2004 | Meduvsky et al. .......... | 280/742 |
| 2004/0041380 A1 | | 3/2004 | Jung et al. ................... | 280/736 |
| 2005/0110254 A1 | | 5/2005 | Engler et al. ................ | 280/736 |
| 2006/0202457 A1 | | 9/2006 | Patterson .................... | 280/740 |
| 2007/0085309 A1 | | 4/2007 | Kelley et al. ................ | 280/736 |
| 2007/0085311 A1 | | 4/2007 | Hofmann et al. | |
| 2007/0228013 A1 | | 10/2007 | Stevens | |

FOREIGN PATENT DOCUMENTS

EP          570347       * 11/1993

OTHER PUBLICATIONS

U.S. Appl. No. 11/732,851.
Office Action having a mailing date of Jan. 15, 2008 regarding U.S. Publication No. 2007-0228013 (11,732,851).
Office Action for U.S. Appl. No. 11/361,936 filed Feb. 23, 2006 dated for Apr. 2, 2008.

* cited by examiner

*Primary Examiner*—Eric Culbreth
(74) *Attorney, Agent, or Firm*—L.C. Begin & Associates, PLLC.

(57) ABSTRACT

A gas generator (10) is provided including a housing (12). A gas generating composition (16) produces expanded gases upon activation of the inflator (10), thereby increasing the internal pressure and compressing the spring (50) operably coupled to the gas release member (40). As the spring (50) is compressed, a gas exit aperture (27), sealed prior to gas generator (10) activation, is opened as the gas release member (40) is unseated from gas exit aperture (27). After gas generator (10) activation, the spring energy of the spring (50) gradually equalizes and then counters the gas pressure of the system gases, thereby once again attenuating the gas exit opening (27) to maintain an optimum average system pressure as the gas is released from the housing (12).

17 Claims, 2 Drawing Sheets

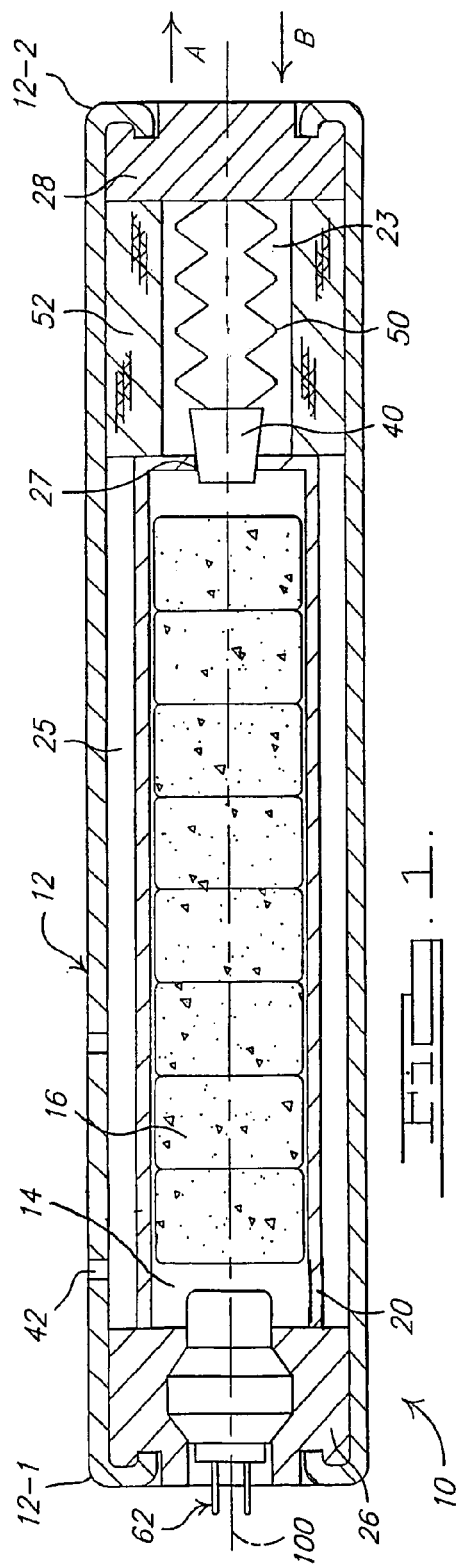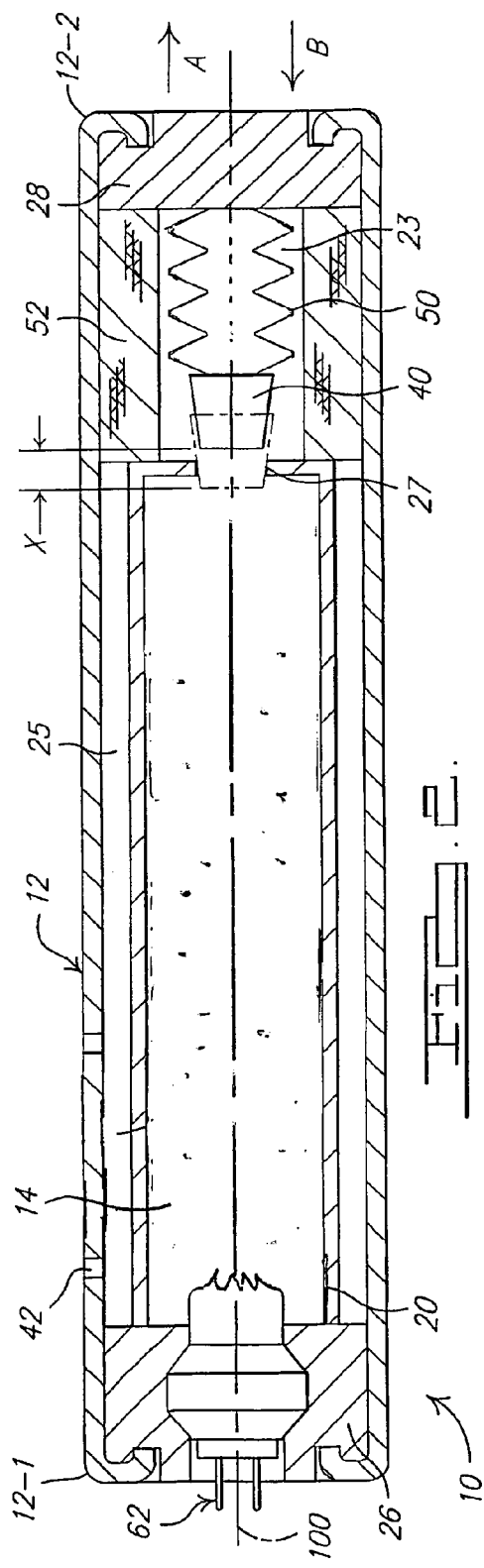

INFLATOR COMBUSTION CONTROL MECHANISM

CROSS-REFERENCE TO RELATED APPLICATIONS

The present application claims the benefit of U.S. Provisional Application Ser. No. 60/657,498 having a filing date of Mar. 1, 2005.

BACKGROUND OF THE INVENTION

The present invention relates to inflators for vehicle airbags and, more particularly, to an inflator incorporating a mechanism for maintaining an average combustion pressure within a predetermined range.

Many solid propellants have an optimum pressure range for combustion. It can be difficult to maintain the inflator internal pressure within the optimum pressure range during the majority of the combustion reaction. In addition, low-pressure combustion of the propellant outside of the optimum pressure range may increase the generation of undesirable effluents. Furthermore, operating outside of the optimum combustion range may adversely affect the combustion, thereby abbreviating or shortening the burn of the propellant, or inhibiting sustained combustion of the propellant. It is therefore desirable to maintain the inflator internal pressure within the optimum range for combustion of the propellant for as much of the combustion reaction as possible.

SUMMARY OF THE INVENTION

The above-referenced concerns are resolved by a gas generator containing a spring-biased gas release member to provide a sustained optimum combustion pressure. A gas generating composition contained within the gas generator produces expanded gases upon activation of the gas generator, thereby increasing the inflator internal pressure. A perforate housing of the gas generator is formed by an outer wall, and has a first end and a second end. A combustion chamber formed by an inner wall within the housing, has a first end and an open second end, each chamber end corresponding to the respective ends of the housing. A spring-biased gas release member is seated within the open second end prior to gas generator activation. A spring is biased against the gas release member to provide a seal prior to gas generator activation, and yet also provide a controlled opening of the second end upon gas generator activation. After gas generator activation, as the gas pressure gradually decreases, the spring energy of the spring gradually equalizes and then counters the gas pressure of the system gases, thereby once again attenuating the gas exit opening to maintain an optimum average system pressure as the gas is released from the combustion chamber and routed out through the perforated housing wall. Accordingly, the spring-biased gas release member regulates pressure thereby affecting a resilient seal and at least partially sealing the gas exit aperture of the second end as combustion pressure dissipates.

BRIEF DESCRIPTION OF THE DRAWINGS

In the drawings illustrating embodiments of the present invention:

FIG. 1 is a cross-sectional side view of an inflator in accordance with the present invention prior to inflator activation; and FIG. 2 is a cross-sectional side view of the inflator of FIG. 1 after inflator activation.

DETAILED DESCRIPTION

Figure 3:
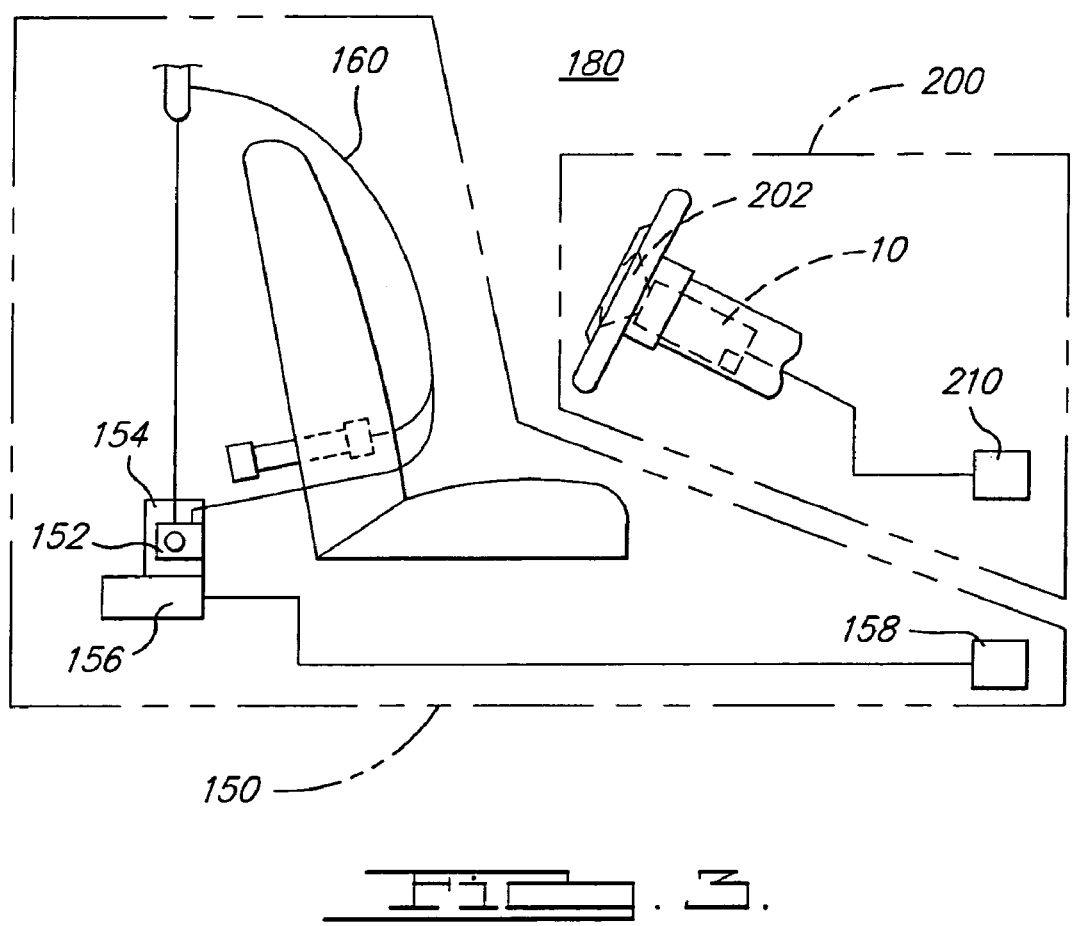
FIG. 3 exemplifies a combustion pressure regulation mechanism contained within a vehicle occupant protection system, in accordance with the present invention.

FIG. 1 shows a cross-sectional view of one embodiment of an inflator 10 in accordance with the present invention. Inflator 10 is contemplated for use primarily in passenger-side inflatable restraint systems in motor vehicles, such as are known in the art; however, it is not limited thereto. The components of inflator 10 may be manufactured from known materials and by known processes.

Inflator 10 includes an elongate, generally cylindrical inflator body 12 defining an enclosure and having a first end 12-1, a second end 12-2, and a longitudinal axis 100. A plurality of inflation gas exit apertures 42 are formed along inflator body 12 to enable fluid communication between an interior of the inflator body and associated inflatable element of the vehicle occupant protection system (for example, an airbag.) Inflator body 12 may be cast, stamped, extruded, or otherwise metal-formed. Apertures 42 may be formed along the inflator body by punching, piercing, or other methods known in the art.

Endcaps 26 and 28 are secured at opposite ends of inflator body 12 using one or more known methods, to close the ends of the inflator body. In FIG. 1, ends of inflator body 12 are crimped over portions of first and second caps 26, 28 to secure the caps within the inflator body. Endcaps 26 and 28 may be cast, stamped, extruded, or otherwise metal-formed. Alternatively, endcaps 26 and 28 may be molded from a suitable high-temperature resistant polymer.

In one embodiment, the combustion chamber 14 is defined by an inner wall 20 positioned and secured concentrically within housing 12, preferably centered about housing longitudinal axis 100. Combustion chamber 14 forms, in conjunction with housing 12, an annular passage or plenum 25 through which combustion gases propagate to discharge apertures 42 from combustion chamber 14. As such, passage 25 is designed to cool the combustion products and to reduce or eliminate flaming of the combustion products prior to the products exiting the inflator through apertures 42. Combustion chamber 14 may be cast, stamped, extruded, or otherwise metal-formed.

An aperture 27 is formed in an end portion of combustion chamber 14 for receiving a plug 40 therein. Plug 40 acts to seal combustion chamber 14 during combustion of a gas generant 16 until a predetermined pressure is achieved in chamber 14, after which plug 40 is partially expelled from aperture 27 in a controlled manner, as described in greater detail below. Chamber 14 is sized such that a cavity 23 is formed between chamber 14 and endcap 27 to provide for positioning of plug 40, a spring member 50, and a buffer 52 therein, as described below. The use of the spring-biased gas release member 40 seals the combustion chamber thereby obviating the need to seal the perforations or gas exit orifices in the housing 12, unless otherwise desired.

A quantity of a propellant or gas generant composition 16 is positioned in combustion chamber 14. Any suitable propellant might be used and exemplary compounds are disclosed in U.S. Pat. Nos. 5,872,329, 6,074,502, and 6,210,505, incorporated herein by reference. The compositions described in these patents exemplify, but do not limit, gas generant compositions useful in the application described herein.

Referring again to FIG. 1, end cap 26 supports an igniter 62 operably associated with combustion chamber 14 such that upon receipt of a signal generated in a known manner, gas generant composition 16 is ignited in a conventional manner. Depending on spatial and manufacturing requirements, the position and orientation of igniter 62 might be varied without departing from the scope of the present invention. For example, igniter 62 need not be positioned within inflator body 12. One example of an igniter suitable for the application described herein is disclosed in U.S. Pat. No. 6,009,809, incorporated herein by reference. Other igniters mountable so as to be in operable communication with chamber 14 may also be used.

A filter or buffer 52 is incorporated into the inflator design for filtering particulates from gases generated by combustion of gas generant 16. The filter also acts as a heat sink to reduce the temperature of the hot inflation gas. In general, filter 52 is positioned in cavity 23 intermediate of the combustion chamber aperture 27 and annular passage 25, thereby ensuring that inflation gas passes through the buffer before entering passage 26. In a first embodiment, buffer 52 is formed from one or more layers of a compressed knitted metal wire, commercially available from vendors such as Metex Corp. of Edison, N.J. Other, suitable materials may also be employed.

A plug 40 is movably positioned within combustion chamber aperture 27 to seal the combustion chamber during combustion of gas generant 16 until a predetermined pressure is achieved in chamber 14, after which plug 40 is partially expelled from aperture 27 in a controlled manner, as described in greater detail below.

Plug 40 may be cast, stamped, extruded, or otherwise metal-formed. Alternatively, plug 40 may be molded from a suitable high-temperature resistant polymer. In the embodiment shown in FIGS. 1 and 2, it is preferable that the design of plug 40 and the material from which the plug is formed be selected to minimize the mass of the plug. Reduction of the mass of the plug 40 reduces the static and dynamic inertia of the plug during actuation, thereby enhancing the responsiveness of the pressure regulation mechanism described herein.

A spring member 50 is operably coupled to endcap 28 and to plug 40 for exerting a biasing force on plug 40 acting in the direction indicated by arrow "B". Spring member 50 may have any one of several configurations, such as a coil spring, a spiral spring, a leaf spring, or any other configuration suitable for providing the required biasing force while being enclosable in inflator body 12. Spring member 50 is configured to have a spring constant that enables plug 40 to move in direction "A" in a predetermined manner in response to pressure variations within the inflator body, as described in greater detail below. It will be appreciated that "operably coupled" simply means that the spring 50 be positioned between the end cap 28 of housing 12 and the spring-biased gas release member 40. Accordingly, the spring 50 may be fixed to either or both components 28 and/or 40. Or, alternatively, the spring 40 may simply be positioned freely between the endcap 28 and the gas release member 40.

Spring member 50 may be formed from a metal, metal alloy, or a polymer material. In the embodiment shown in FIGS. 1 and 2, it is preferable that the configuration of spring member 50 and the material from which the spring member is formed combine to minimize the mass of the spring member. This reduces the static and dynamic inertia of the spring member during actuation of plug 40, thereby enhancing the responsiveness of the pressure regulation mechanism described herein.

It will further be appreciated that design considerations such as the type of propellant, and the burn characteristics thereof, and the pressure tolerances of the vessel 10, combined with the spring energy of a given spring member 50 and the total area of the gas exit aperture 27 may be iteratively harmonized to result in a desired average pressure within the pressured vessel 10. As such, when properly informed with the data typically developed in gas generant manufacture, such as the pressure and temperature characteristics required for an optimized combustion of the propellant, other design criteria such as the number and size of gas exit orifices in the housing 12, and the type and strength of the spring member may be appropriately and iteratively selected to result in a pressure vessel that essentially maintains an optimized average pressure. In sum, the selection of spring 50, and the total gas exit aperture area sealed by the plug 40 may be either singularly or jointly evaluated on a trial and error basis depending on the propellant composition desired, and further depending on other design variables as known in the art.

In an alternative embodiment, spring member 50 is not coupled to plug 40, but is rather positioned to contact and exert force on plug 40 after the plug has traveled a predetermined amount along inflator housing 12, in direction "A".

In operation, the pressure regulation mechanism incorporated in inflator 10 is designed to maintain the inflator internal pressure within a specified range determined to be an optimum pressure range for combustion of gas generant 16. It is desirable to maintain the internal inflator pressure within this pressure range for the majority of the combustion process.

Prior to activation of the inflator 10, plug 40 rests in the position shown in FIG. 1. In this position, plug 40 prevents inflation gases from entering annular passage 25 until the predetermined pressure is achieved in chamber 14. In operation, when deployment of the vehicle inflatable restraint system is desired, an activation signal is sent to igniter 62 operably associated with combustion chamber 14 of the inflator. Gas generant 16 is consequently ignited, directly or via a booster propellant such as is known in the art. Ignition of the gas generant 16 causes a rapid production of hot inflation gases in chamber 14, and therefore a corresponding increase in gaseous pressure.

In order for inflation gas to exit combustion chamber 14 into annular passage 25, plug 40 must be at least partially removed from combustion chamber aperture 27. In addition, plug 40 must be removed from aperture 27 enough to provide an opening size sufficient to permit at least a minimum predetermined flow rate of inflation gas through aperture 27 and around plug 40, in order to properly inflate the airbag. The required opening size for any given application may be determined in accordance with design requirements of a particular system. Referring to FIG. 2, the required minimum opening size may be achieved by moving plug 40 a distance X in direction "A", against the biasing force exerted by spring member 50 on the plug. Plug 40 is preferably maintained in this position during combustion, to allow the inflation gas to exit combustion chamber 14. As plug 40 is moved in direction "A", spring member 50 compresses, thereby increasing the spring force $f_S$ exerted on plug 40 in direction "B". To maintain plug 40 in the desired open position when the plug has moved distance X, a substantially constant inflation gas pressure force $f_G$ must be exerted on plug 40 in direction "A" to balance spring force $f_S$. Gas pressure force $f_G$ is a function of the inflator combustion pressure and the area on plug 40 over which the inflator pressure acts. As stated previously, it is desirable that the inflator internal pressure during gas generant combustion be maintained within a specified range. Thus, the spring constant of spring member 50 is preferably specified such that plug 40 is movable a distance X from its rest position to a new position (to provide the required minimum opening size) and maintainable in the new position by an inflator internal pressure within the specified pressure range. In cases where it is desirable to avoid internal pressures outside the specified range on the low end of the range, the spring constant of spring member 50 may be specified such that plug 40 is movable a distance X from its rest position (to provide the required minimum opening size) and maintainable in the new position by an inflator internal pressure residing between a median of the specified or design pressure range and an upper limit of the specified pressure range. Inflation gas exiting aperture 27 flows through buffer 52 into annular passage 25, exiting the inflator through apertures 42.

Inflator housings having configurations other than the cylindrical shape shown herein may be used, provided they are suitable for incorporating an embodiment of the pressure regulation mechanism described herein.

Accordingly, the present invention maintains the inflator combustion pressure within an optimum range during the majority of the combustion event by automatically and continually controlling the inflation gas exit aperture area. The pressure regulation mechanism disclosed herein greatly improves the ballistic performance of the inflator, while minimizing the generation of undesirable effluents due to low-pressure combustion.

Referring to FIG. 3, a gas generating system including a gas generator or inflator 10 described above is incorporated into an airbag system 200. Airbag system 200 includes at least one airbag 202 and a gas generator 10 as described herein coupled to the airbag so as to enable fluid communication with an interior of the airbag upon activation of the gas generating system. Airbag system 200 may also be in communication with a known crash event sensor 210 that is in operative communication with a crash sensor algorithm (not shown) which signals actuation of airbag system 200 via, for example, activation igniter 62 (not shown in FIG. 3) in the event of a collision.

Referring again to FIG. 3, an embodiment of the gas generating system or an airbag system including an inflator of the present invention may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Exemplifying yet another gas generating system containing an inflator of the present invention, safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

In yet another aspect of the invention, a method of controlling the combustion within a gas generator includes the following steps:
1) providing a gas generant composition within a combustion chamber for production of gases upon combustion thereof;
2) resiliently sealing a gas exit aperture of the combustion chamber, thereby permitting egress of gases produced upon combustion of the gas generant composition; and
3) modulating the open area of the gas exit aperture to maintain a predetermined pressure range within the gas generator upon combustion of the gas generant composition.

It will be appreciated that the clause "resiliently sealing" refers to a seal provided in the gas exit aperture that initially seals the combustion chamber and then, upon gas generator activation, at least partially seals the gas exit aperture at some point thereafter. Stated another way, the seal of the gas exit aperture is therefore at least partially restored after gas generator activation. It should also be recognized that "modulating the open area" refers to the ability to tailor the open area of the gas exit aperture at a given moment after gas generator activation and during the combustion process, and thus maintain a predetermined pressure range within the gas generator. As described above, the exemplary embodiments contemplate a spring-biased gas release member that is movably positioned within the gas exit aperture of the combustion chamber, thereby facilitating steps 2 and 3 enumerated above. A gas generator, a gas generating system, and a vehicle occupant protection system implementing the method described above are also contemplated.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generator comprising:
a housing formed by a perforate outer wall;
a combustion chamber within said housing, said combustion chamber formed by an inner wall having a first end and a second end, said second end defining a gas exit aperture;
a filter positioned alone a flow path of gases from the inner wall gas exit aperture to the outer wall for filtering and cooling combustion gases flowing from the combustion chamber to the outer wall;
a gas generating composition contained within said combustion chamber, for producing combustion gases upon activation of said gas generator;
a gas release member seated within said gas exit aperture, said gas release member employed for sealing said combustion chamber prior to activation of said gas generator, and, said gas release member movable within said gas exit aperture upon production of combustion gases, thereby releasing gas from said gas exit aperture; and
a spring operably coupled to said gas release member and to said housing, thereby affecting a resilient sealing of said gas exit aperture both before and after activation of said gas generator,
wherein, after activation of the gas generator, combustion gases exit the combustion chamber via the inner wall gas exit aperture flowing in a first direction, pass through the filter for cooling, and then flow along the outer wall in a second direction substantially opposite the first direction for additional cooling.

2. The gas generator of claim 1 wherein said gas release member is a plug.

3. The gas generator of claim 1 wherein said housing further comprises a first end and a second end, and, said spring is positioned between said gas release member and said second end.

4. A vehicle occupant protection system comprising the gas generator of claim 1.

5. A gas generating system comprising the gas generator of claim 1.

6. The gas generator of claim 1 further comprising a cavity in fluid communication with the outer wall and the combustion chamber after activation of the gas generator, and wherein the filter is positioned in the cavity.

7. A gas generating system comprising:
a housing formed by a perforate outer wall;
a combustion chamber within said housing, said combustion chamber formed by an inner wall having a first end and a second end, said second end defining a gas exit aperture, said inner wall being positioned within said housing to form a plenum between the inner wall and the outer wall and a cavity between the plenum and the combustion chamber;
a filter positioned within the cavity for filtering and cooling combustion gases flowing from the combustion chamber into the plenum;
a gas generating composition contained within said combustion chamber, for producing combustion gases upon activation of said gas generator; and
a spring-biased gas release member seated within said gas exit aperture, said gas release member employed for sealing said combustion chamber prior to activation of said gas generator, and, said gas release member movable within said gas exit aperture upon production of combustion gases, thereby releasing gas from said gas exit aperture.

8. The gas generating system of claim 7 wherein said spring-biased gas release member is a plug.

9. The gas generating system of claim 7 wherein said housing further comprises a first end and a second end, and, a spring positioned between said gas release member and said second end thereby exerting a bias on said gas release member for sealing said at least one gas exit orifice.

10. The gas generator of claim 7 wherein, after activation of the gas generator, combustion gases exit the combustion chamber via the inner wall gas exit aperture flowing in a first direction, pass through the filter, and then enter the plenum flowing in a second direction substantially opposite the first direction.

11. A method of controlling combustion within a gas generator comprising the steps of:
providing housing containing a combustion chamber therein, a gas generant composition within the combustion chamber for production of gases upon combustion thereof, a plenum formed between the housing and the combustion chamber for cooling combustion gases prior to the gases exiting the housing, and a filter for filtering and cooling combustion gases flowing from the combustion chamber into the plenum;
resiliently sealing a gas exit aperture of the combustion chamber, thereby permitting egress of gases produced upon combustion of the gas generant composition; and
modulating the open area of the gas exit aperture to maintain a predetermined pressure range within the gas generator upon combustion of the gas generant composition.

12. The method of claim 11 wherein the step of resiliently sealing the gas exit aperture is facilitated by providing a spring-biased gas release member seated within the gas exit aperture.

13. The method of claim 11 wherein the step of modulating the open area of the gas exit aperture is facilitated by providing a spring member operably coupled to a plug seated within the gas exit aperture.

14. A gas generator implementing the method of claim 11.

15. A gas generating system implementing the method of claim 11.

16. A vehicle occupant protection system implementing the method of claim 11.

17. The gas generator of claim 11 further comprising the step of directing gases resulting from combustion of the gas generant composition in a first direction, then through the filter, then along the plenum in a second direction substantially opposite the first direction.

* * * * *

UNITED STATES PATENT AND TRADEMARK OFFICE
CERTIFICATE OF CORRECTION

PATENT NO. : 7,438,316 B2 Page 1 of 1
APPLICATION NO. : 11/365374
DATED : October 21, 2008
INVENTOR(S) : Patterson It is certified that error appears in the above-identified patent and that said Letters Patent is hereby corrected as shown below:

Column 6; Line 45; delete "alone" and insert --along--

Signed and Sealed this

Thirtieth Day of December, 2008

JON W. DUDAS
*Director of the United States Patent and Trademark Office*